L. B. HOIT.
Reaping and Mowing Machine.
No. 52,167.                                        Patented Jan'y 23, 1866.
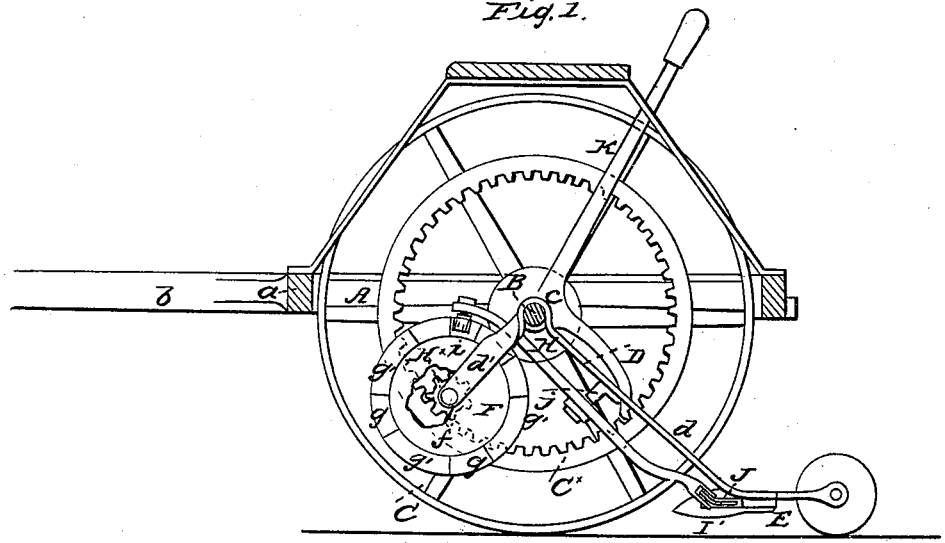
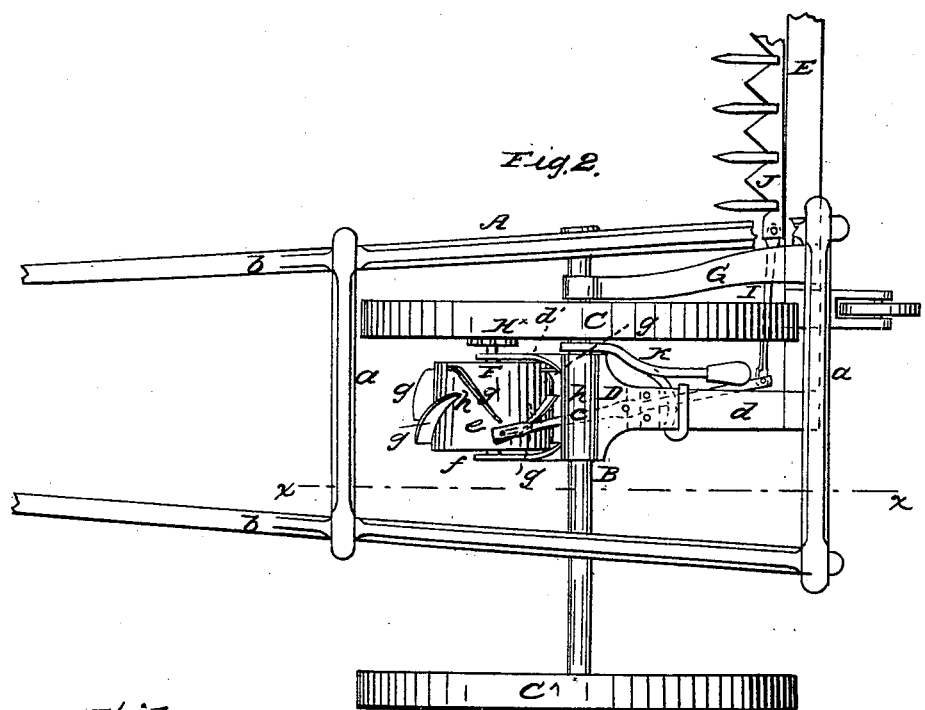

UNITED STATES PATENT OFFICE.

L. B. HOIT, OF CEDAR FALLS, IOWA.

IMPROVEMENT IN REAPING AND MOWING MACHINES.

Specification forming part of Letters Patent No. 52,167, dated January 23, 1866.

*To all whom it may concern:*

Be it known that I, L. B. HOIT, of Cedar Falls, in the county of Black Hawk and State of Iowa, have invented a new and Improved Reaping and Mowing Machine; and I do hereby declare the following to be a full, clear, and exact description of the nature, construction, and operation of the same, sufficient to enable one skilled in the art to which it refers to construct and use the same, reference being had to the accompanying drawings, which are made part of my invention, and in which—

Figure 1 is a side sectional view of my invention, taken in the line $x\ x$, Fig. 2. Fig. 2 is a plan or top view of the same.

Similar letters of reference indicate corresponding parts in the two figures.

This invention relates to a new and useful improvement in the sickle-driving mechanism, whereby several important results are attained, to wit, the finger-bar and sickle are placed in a balanced state, so that they may be raised with facility whenever required and allowed to conform readily to the inequalities of surface over which they may pass, the sickle-driving mechanism also favoring the draft of the machine and possessing the advantage of throwing the pitman out of gear automatically whenever the machine is backed, so that there cannot be any motion of the sickle during a retrograde movement of the former.

A represents the main frame of a mowing-machine provided with my improvement, said frame consisting of cross-bars $a\ a$ connected to thills $b\ b$.

B represents the axle of the machine, on which the wheels C C' are placed loosely, one wheel, C, being between the thills $b\ b$ and having a toothed rim, $C^\times$, attached concentrically to it. (Shown clearly in Fig. 1.)

D represents an arm, which is bent and bitted on the axle B and secured to it by a pin or bolt, $c$. The rear part, $d$, of the arm D extends back of the axle in an inclined position, and has the finger-bar E secured to its rear end at right angles. The front part, $d'$, of the arm D extends forward of the axles in an inclined position, and is slotted or cut out in a longitudinal direction to receive a cam, F, which is composed of a wheel, $e$, the shaft of which has its bearings in the front end of the part $d'$ of the arm.

The finger-bar may be braced or stayed from the axle B by a bar, G, the rear end of which is attached to the axle B.

On the shaft $f$ of the cam F there is a pinion, $H^\times$, which gears into the toothed rim $C^\times$ of the wheel C and communicates motion to the cam as the machine is drawn along.

On the periphery of the cam-wheel $e$ there are secured a series of oblique wings or flanges, $g\ g'$, two sets or series of them, one set or series, $g$, having a reversed position to the other set or series, $g'$, as shown clearly in Fig. 2. The wings or flanges $g\ g'$ are not in contact, the rear end of one set or series not extending to the front ends of the other set or series, but a space, $h$, left between them sufficiently wide to admit of the friction-roller $i$ of a pitman, H, to pass through, and after being acted upon by one wing or flange to be acted upon by the succeeding one.

The pitman H is secured, by a rivet-bolt, $j$, to the rear part, $d$, of the arm D, the rear end of said pitman being connected, by a link, I, to the sickle-bar J. The front end of the pitman is bent down or has a pendent pin attached, on which the roller $i$ is fitted. This cam, thus constructed, imparts a reciprocating motion to the sickle, and the pitman will always remain in gear with the cam, or will not become casually disconnected therefrom while the machine is in work or is being drawn along; but in backing the machine the pitman will at once be thrown out of gear with the cam, either to the right or the left of the same, according to which wing or flange of the two sets or series act against the roller $i$. This is an important feature, as it effectually prevents the contingency of the sickle working during a retrograde movement of the machine.

Another advantage of the invention consists in the balancing of the finger-bar and sickle, which is done by the cam F, the weight of which at the front end of the arm D nearly coincides with the weight of the finger-bar and sickle at the rear end of said arm. Hence the finger-bar and sickle may be readily raised whenever required by means of a lever, K, attached to the arm D, and the finger-bar will readily conform to the inequalities of surface over which it may pass.

Another advantage of the invention consists in the tendency of the cam F to favor the draft of the device, or lighten or ease the same, a result due to the position of the cam in front of the axle and at the front part of the toothed rim, the gravity of the cam having an inclination to favor the rotation of the wheel C.

By the above-described arrangement the cutting apparatus operates equally well with the bar at any height, and when the bar has been raised to pass over an obstruction the sickle moves with even increased velocity in its descent, so that on again striking the grass the cutting apparatus is in full operation and no choking can occur, as is so frequently the case with machines which must be thrown out of gear when the bar is raised, and again thrown in gear when the parts are returned to their working position.

Having thus described my invention, the following is what I claim as new and desire to secure by Letters Patent:

1. The cam F provided with oblique wings or flanges $g\ g'$, arranged, as shown, to impart a reciprocating motion to the sickle through the medium of the link and pitman, and at the same time cause the latter to be automatically thrown out of gear with the cam, at either side of the same when the machine is backed, substantially as described.

2. The yoke or levers D, employed to so connect the finger-bar E and cam F that the latter will partially counterbalance the former.

3. The combination and relative arrangement of the raising-lever K, yoke D, cam F, and finger-bar E, to facilitate the elevation of the cutting apparatus, and adapted to be raised to any height without throwing it out of gear.

The above specification of my invention signed by me this 13th day of December, 1865.

L. B. HOIT.

Witnesses:
O. D. MUNN,
THEO. LUSCH.